Figure 1:
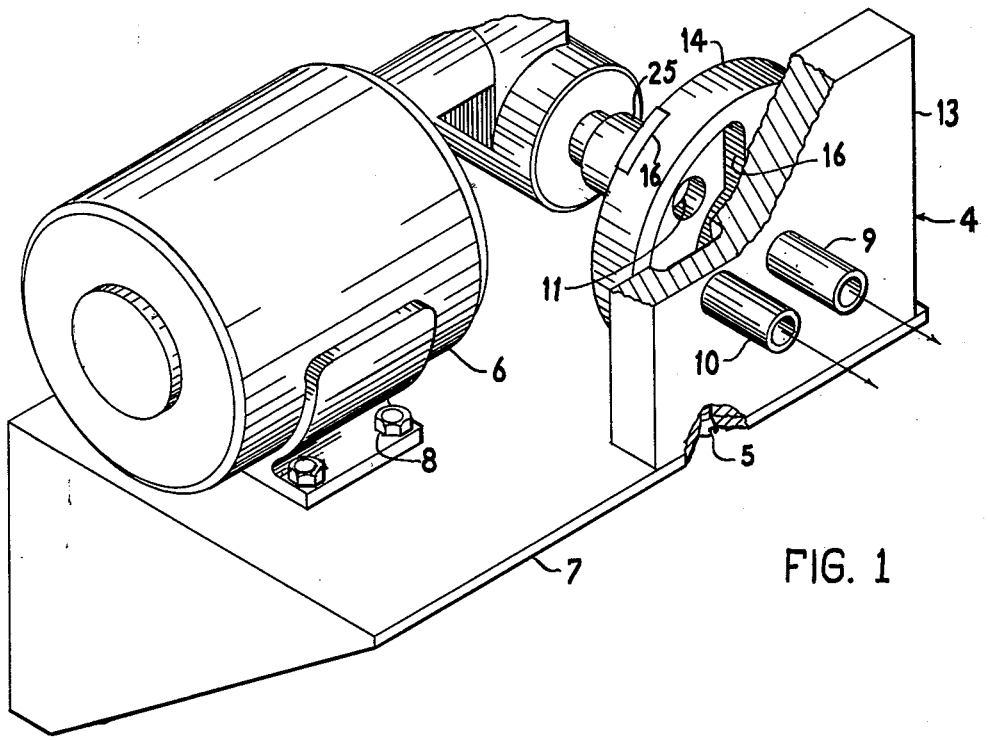

June 4, 1963   L. T. CONDE   3,092,073
ROTARY VALVE FOR A MILK RELEASER
Filed March 21, 1960   2 Sheets-Sheet 1

INVENTOR.
LYALL T. CONDE
BY
John P. Murphy
ATTORNEY

June 4, 1963 L. T. CONDE 3,092,073
ROTARY VALVE FOR A MILK RELEASER
Filed March 21, 1960 2 Sheets-Sheet 2

INVENTOR.
LYALL T. CONDE
BY
John P. Murphy
ATTORNEY

United States Patent Office 3,092,073
Patented June 4, 1963

3,092,073
ROTARY VALVE FOR A MILK RELEASER
Lyall Thompson Conde, Sherrill, N.Y., assignor to Conde Milking Machine Company, Sherrill, N.Y., a corporation of New York
Filed Mar. 21, 1960, Ser. No. 16,585
3 Claims. (Cl. 119—14.05)

This invention relates to milking machines, and more particularly to a rotary valve for alternately admitting atmospheric pressure and vacuum into the milking system. The invention also relates to the combination of a pipeline type milking system and a rotary valve for admitting atmospheric pressure and vacuum to the releaser of the said milking system. The invention also relates to the combination of a pipeline type milking system or to a pail model to operate the teat cup assemblies.

Heretofore milking machinery which is operated by vacuum has required the inclusion of a device for controlling the alternate admission of vacuum and atmospheric pressure to various components of the machinery so as to carry out the milking operation. One such application has been in the form of the conventional pulsator, which is generally a self-operating, oscillating controller. Vacuum supplied to the pulsator from a pipeline causes a movable member to oscillate over a series of ports to alternately supply atmospheric pressure or vacuum to the apparatus to which the pulsator is connected. Thus the teat cup assembly of a milker is caused to squeeze or release the teats of a cow for milking. A pulsator attached to a vacuum releaser operates same and effects the transfer of milk from a pipeline under vacuum leading to a bulk tank or other receptacle, permitting the flow of milk into the bulk tank or other receptacle.

One disadvantage of a pulsator type of vacuum controller is that the pulsator must be made of parts which are manufactured with a high degree of precision. This is necessitated by the precise timing requirement of the controller and by the very nature of its proper operation, and is resultantly expensive. Such units must be constantly maintenanced as to cleaning and lubrication so as to keep wear to a minimum. A second disadvantage of a pulsator type of controller is the requirement of maintenance against moisture, cold, heat and general weather conditions. Areas in which the controller is used are inherently dirty, and at best, dust-laden. A lubricating medium for the controller such as oil also traps and retains harmful particles of dust, making the matter of sanitation and maintenance more complicated.

It is therefore a main object of this invention to provide a control means for the vacuum and atmospheric pressure in milking systems which is inherently simple in design.

It is another object to provide a control means for the vacuum and atmospheric pressure in milking systems which contains the minimum number of parts for efficient and proper operation.

Another main object is to provide a control means as above, the application of which is flexible to the extent that control can be afforded where it is needed.

Another object is to provide a control means as above which can be manufactured in various designs whereby to vary the timing of the controlled admittance of vacuum and atmospheric pressure.

Still a further object of the invention is to provide a control means as above in combination with a milking system to more efficiently and positively control the admittance of vacuum and atmospheric pressure into the milking system.

In accordance with the foregoing objects there is provided a ported stationary member, a ported rotatable member mounted in juxtaposition with the stationary member, inlet connections for vacuum and atmospheric pressure, and an outlet connection, and means for turning the rotatable member, whereby vacuum and atmospheric pressure are alternately connected to the outlet means in variable predetermined timed order.

Figure 2:
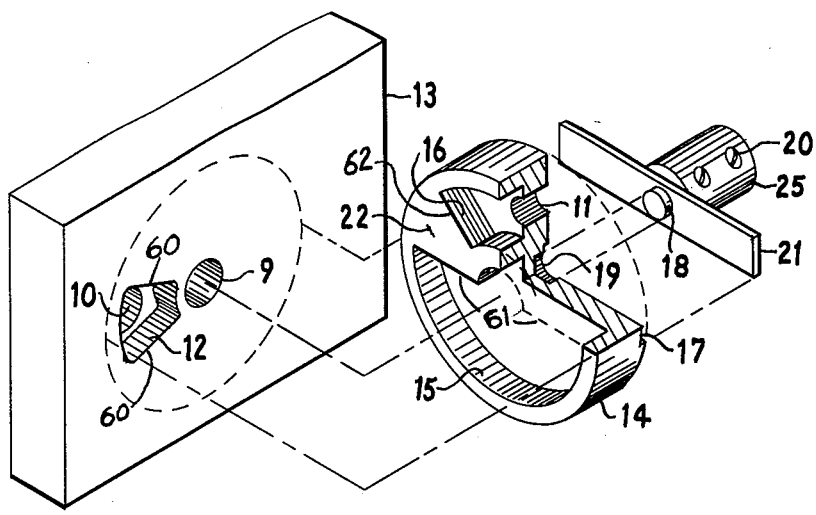
Figure 3:
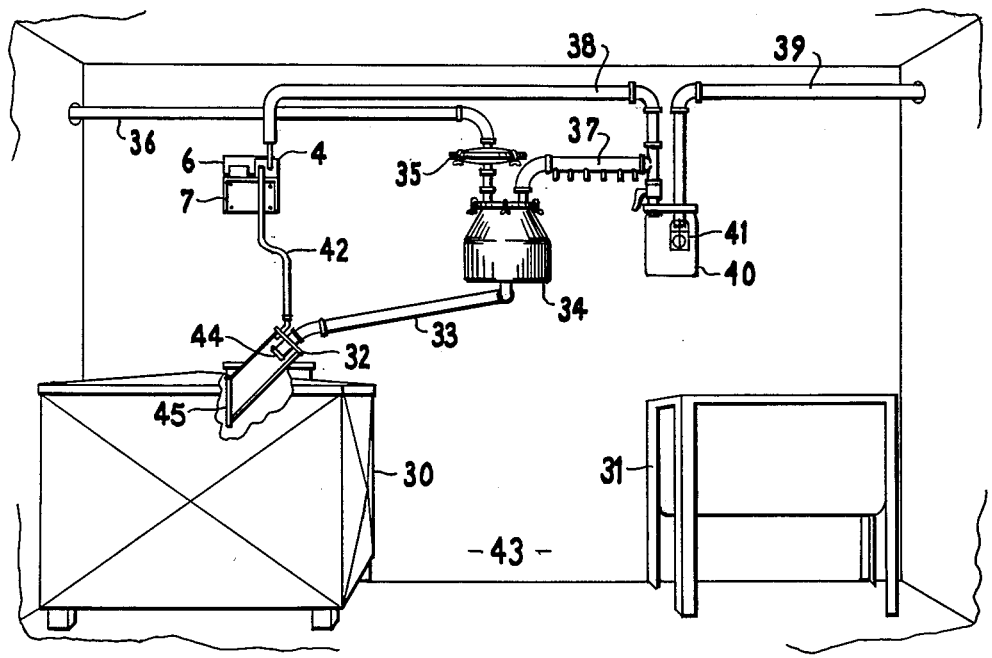
Figure 4:
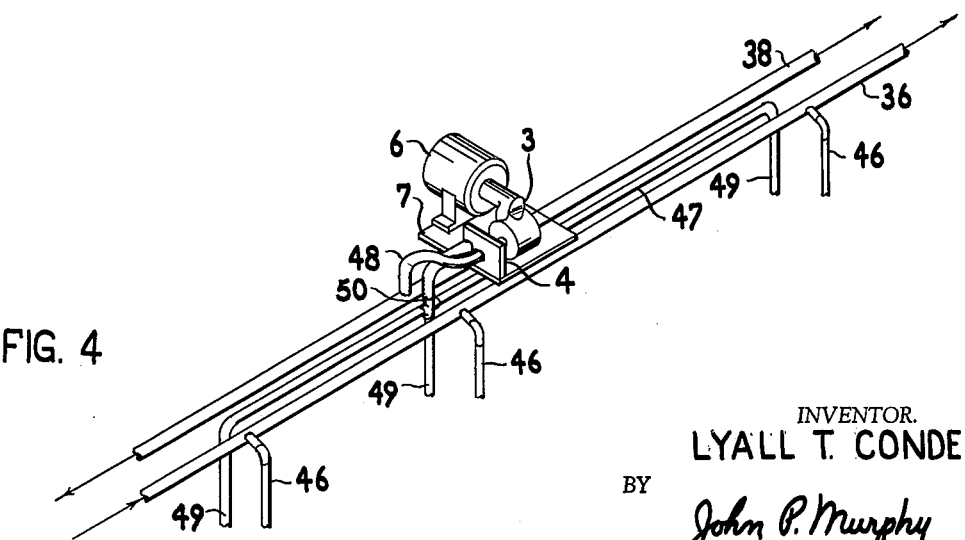

In the drawings:
FIGURE 1 is an isometric view of an embodiment of a rotary valve with parts cut away, driving means, and a mounting means.
FIGURE 2 is an isometric exploded view of the rotary valve.
FIGURE 3 illustrates an arrangement of equipment of a pipeline milking system in the milk room, and shows the application of the rotary valve in the milking system to operate a releaser.
FIGURE 4 illustrates the installation of a rotary valve as in a milking parlor or milk barn to operate teat cup assemblies.

FIGURE 1 illustrates an embodiment of a valve for milking machinery, generally designated at 4. The valve 4 generally comprises a stationary plate 13 which may be attached to any suitable bracket 7 by means of screws 5 or the like. The plate 13 has formed therethrough a vacuum connection which may be conveniently provided with a nipple 9 to facilitate the attachment thereto of a flexible hose or the like, not shown. An outlet connection is also formed through the plate 13 and is similarly provided with a nipple 10. The back side of the plate 13, see FIGURE 2, may have formed therein a port 12 of suitable size as to controllably admit vacuum or atmospheric pressure to the outlet 10, as will appear. The port 12 is fan-shaped, being narrower near the center of the plate and wider near the edge. Thus, the radial edges 60 of the port 12 lie substantially on radii from the center of the vacuum connection to permit more rapid and abrupt opening and closing of the valve action as the rotary member, to be described, is operated.

A rotatable disc 14 is mounted for rotary movement in juxtaposition with the plate 13. The disc 14 has formed therethrough an atmospheric pressure connection 11, which may be in the form of a hole or the like. An atmospheric pressure port 16 may be formed in the face of the disc 14 facing the backside of the plate 13, and may be of suitable size, as will appear. A vacuum port 15 is also formed in the same face of the plate 14 for admitting vacuum to the outlet of the plate 13. The radial edges 61 of port 15 and radial edges 62 of port 16 are determined by and lie substantially on radii from the center of the rotatable disc. The angle of the radial edges of ports 15 and 16 correspond with the angle of the radial edges of port 12. Each port, 15 and 16, is formed by hollowing out or molding the material forming the disc 14.

The plate 13 is preferably formed of stainless steel, while the disc 14 may be fabricated of a graphite composition, oil-impregnated bronze, or the like. Further, the face of the disc 14 and the backside of the plate 13 are machine ground to an extremely smooth finish, so that the disc 14 may be rotated in close juxtaposition with the plate 13 at a low speed without the need for bearings and the like. No lubricant between the rotating disc and the stainless steel plate 13 is required due to the smoothness of the surfaces and the material from which the disc 14 is made.

Means for rotating the disc 14 is provided in the form of a small fractional horsepower motor 6 which may be fastened to the supporting bracket 7 by means of bolts 8. A speed reduction gear-motor 3 is integrally connected with the motor 6, and may be of the right angle drive type, so that the output shaft is directed at a right angle with respect to the motor. This arrangement is purely optional, and is preferred only in connection with the layout of the motor 6 and valve 4 on the bracket 7.

The disc 14 is rotated directly by means of a coupler 25 attached to the output shaft of the gearmotor 3 by means of set screws 20. A bar 21, forming part of the coupler 25, fits into a groove 17 in the back of the disc 14 to transmit rotational force to the disc to rotate same. A pilot stud 18 on the coupler 25 fits into a pilot hole 19 in the back of the disc 14 for centering the disc 14 on the axis of the drive means and for aligning the disc with respect to the plate 13. Constant vacuum against the ports in the disc 14 from the vacuum connection in the plate keeps the disc in close juxtaposition with the plate.

The operation of the valve is as follows: Let it be assumed that the valve 4 and its drive means is installed as part of a milking system according to FIGURE 4, wherein the system includes a milk pipeline 36 installed as in a milking parlor. Risers 46 are connected between the pipe 36 and individual teat cup assemblies, not shown. A constant vacuum is available in the parlor by way of vacuum pipe 38 from a source. The rotary valve 4 is installed and the inlet thereof is connected to the vacuum pipe 38 by means of a hose or the like 48, while the outlet of the valve is connected to an air and vacuum manifold 47 by means of a hose 50. Vacuum and air lines 49 each lead to the air claw conventionally associated with a teat cup assembly for operating same.

The motor 6 is turned on and, through the gearmotor 3 and coupler 25, rotates the disc 14. As the vacuum port 15 in the disc moves past the outlet port 12, vacuum present in the vacuum inlet connection 9 and port 15 is applied through the port 12 and outlet 10 to the air claw, through which vacuum is applied to the teat cups. As the vacuum port 15 continues to move past and beyond the outlet port 12, one of two blank areas 22 of the disc 14 is moved into alignment with the port 12, shutting off the vacuum to the outlet 10. The disc 14 continues to rotate and the atmospheric pressure port 16 is moved into alignment with the outlet port 12 and outlet 10, applying atmospheric pressure thereto through the atmospheric pressure inlet 11 in the disc 14, thus permitting atmospheric pressure to the air claw and thence to the teat cups. As the atmospheric pressure port 16 moves past and beyond the outlet port 12, a second blank area on the disc 14 moves into alignment with the port 12, shuttling off the atmospheric pressure. The vacuum port 15 then moves into alignment with the port 12 and the cycle continues so long as the disc is rotated. In this manner, the simplest of devices is utilized to positively cause the application of vacuum and atmospheric pressure alternately to the milking machinery.

It will become apparent that the disc 14 will constantly be in close juxtaposition with the plate 13 due to the fact that there is a constant vacuum through port 9 and in vacuum port 15, and the pilot hole 19 in which is fitted the pilot 18 keeps this disc in proper alignment with the ports on valve 13. Weather conditions, hot, dry, wet or cold, can have no effect on the proper and positive operation of the valve, inasmuch as the positive drive of the motor insures proper operation. Further, the timed intervals of alternate application of vacuum and atmospheric pressure to the outlet port of the valve will always remain constant due to the single, rotary movement of the valve disc; whereas the oscillatory motion of a pulsating device tends to be consistent.

It will become apparent to those skilled in the art that the duration of the intervals of application of vacuum and atmospheric pressure is governed by three factors. These are: the size of the ports in the disc and plate, the amount of overlap of the outlet port in the plate as the disc rotates, and the speed of rotation of the disc, as governed by the gearmotor gear ratios of the r.p.m. of the motor itself. For the above conditions, the valve is inherently flexible in design in that more than one disc and/or plate can be provided with a valve so that a part may be interchanged in order to vary the duration and timing of the intervals of application of vacuum and atmospheric pressure. Further, the gear ratios of the gearmotor may be selected for further flexibility in the design of the valve to meet any given operational requirements.

FIGURE 3 illustrates another application of the invention. In this application, a rotary valve according to the present invention is used in combination with a releaser in the milk room.

The milk room 43 of a dairy farm has therein a substantially conventional arrangement of the elements of a pipeline/bulk tank system including a bulk tank 30 for receiving milk, a wash tank 31 which is used in flushing out and washing the system, and the milk transfer pipeline 36 from the milking area, a milk filter 35 connected to the pipeline 36 for removing sediment from the fluid milk, and a collector 34. A down pipe 33 leads from the collector 34 to a vacuum-operated releaser 32 at the bulk tank 30. The rotary valve 4 is connected to the vacuum line 38 leading from the vacuum pump, not shown; and the outlet of the valve 4 is connected to the releaser 32 by a flex line 42. Line 38 leads from a moisture trap 40 having a float valve 41 suspended from a vacuum line 39 and is connected past the washing manifold 37. Vacuum applied within the releaser 32 at timed intervals by the valve 4 keyed the flapper valve 45 shut and valve 44 open, to allow milk to enter the releaser from the collector 34. During the atmospheric pressure portion of the cycle of valve 4, valve 44 closes and valve 45 opens to release the milk into the tank 30. In this manner, pressure balances within the lines of the system are maintained.

Those skilled in the art will be aware that there is a constant vacuum present in line 36 and in the collector 34. In order to move the milk from the collector 34 into the tank 30 or other receptacle it is necessary to use the releaser 32 so as to provide for releasing small quantities of milk while yet retaining the vacuum in the line 36 and the collector 34. Thus, while the valve 4 of this invention keeps the valve 45 closed, milk flows by gravity from the collector to the releaser; and while valve 44 is shut, the milk is released through the open valve 45 into the tank. By this arrangement, such atmospheric pressure as may be present in the tank 30 is not allowed to enter the collector and thence into the line 36.

Thus it is obvious that the objects of the invention are carried out by the provision of a rotary valve for the controlling of the application of vacuum and atmospheric pressure alternately in a milking system, which valve is inherently simple and flexible in design and contains the minimum number of parts. The valve is positive in operation due to the single motion and single direction of motion of its one moving part; and is therefore maintenance-free to a very high degree. Further, there is provided in combination with a milking system a means for controlling the application of vacuum and atmospheric pressure to those elements of the system which are so operated.

It is to be understood that the foregoing embodiment is presented by way of illustration, and that the invention is not to be limited thereto, but is to be construed within the scope of the appended claims.

I claim:
1. A valve for milking machinery comprising a stationary plate having formed therethrough a vacuum inlet and an outlet, a port formed in one face of said plate and connected to said outlet, a disc mounted for being rotated in juxtaposition with said plate, said disc having formed therein a vacuum port and an atmospheric pressure port in the face thereof facing said plate, said ports having their radial edges located on radii from the center of said disc, an atmospheric pressure inlet connected through said disc to said atmospheric pressure port;

turning means for rotating said disc, and a drive connection between said turning means and said disc.

2. A valve according to claim 1, said turning means having a pilot stud for maintaining said disc in axial alignment with said plate and said inlet in said plate having its radial edges located at an angle corresponding to the radial edges of the ports contained in the rotatable discs.

3. A vacuum operated releaser in a milking system with a rotary valve connected thereto, said valve comprising a plate having formed therethrough a vacuum inlet and an outlet, said plate being stationary; and a disc mounted for being rotated in juxtaposition with said plate, said disc having formed therein a vacuum port and an atmospheric pressure port, whereby the ports in said disc are alternately in communication with the outlet in said plate when the disc is rotated for applying vacuum to the said releaser, the alternate communication of said ports in said disc with said outlet in said plate being in predetermined timed order.

References Cited in the file of this patent
UNITED STATES PATENTS

| | | |
|---|---|---|
| 1,424,401 | Hapgood | Aug. 1, 1922 |
| 2,367,319 | Wahlberg | Jan. 16, 1945 |
| 2,630,783 | Reeve | Mar. 10, 1953 |